United States Patent
Jeansonne et al.

(10) Patent No.: US 12,039,323 B2
(45) Date of Patent: Jul. 16, 2024

(54) BIOS UPDATES

(71) Applicant: HEWLETT-PACKARD DEVELOPMENT COMPANY, L.P., Spring, TX (US)

(72) Inventors: Jeffrey Kevin Jeansonne, Spring, TX (US); Mason Gunyuzlu, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 26 days.

(21) Appl. No.: 17/996,136

(22) PCT Filed: Apr. 21, 2020

(86) PCT No.: PCT/US2020/029100
§ 371 (c)(1),
(2) Date: Oct. 13, 2022

(87) PCT Pub. No.: WO2021/216046
PCT Pub. Date: Oct. 28, 2021

(65) Prior Publication Data
US 2023/0133270 A1  May 4, 2023

(51) Int. Cl.
*G06F 8/654* (2018.01)
*G06F 9/4401* (2018.01)

(52) U.S. Cl.
CPC ............ *G06F 8/654* (2018.02); *G06F 9/4406* (2013.01)

(58) Field of Classification Search
CPC .... G06F 8/654; G06F 9/4406; G06F 11/1469; G06F 11/2017
See application file for complete search history.

(56) References Cited

U.S. PATENT DOCUMENTS

| | | | |
|---|---|---|---|
| 6,625,730 B1* | 9/2003 | Angelo | G06F 11/1417 713/1 |
| 7,840,957 B2 | 11/2010 | Kumashiro et al. | |
| 8,136,108 B2 | 3/2012 | Ha et al. | |
| 8,566,815 B2 | 10/2013 | Schaefer et al. | |
| 9,069,965 B2 | 6/2015 | Liles et al. | |
| 2002/0092008 A1 | 7/2002 | Kehne et al. | |
| 2008/0282017 A1* | 11/2008 | Carpenter | G06F 21/82 710/316 |
| 2009/0013164 A1* | 1/2009 | Huang | G06F 9/4401 713/2 |

(Continued)

FOREIGN PATENT DOCUMENTS

CN  109032673 A  12/2018

*Primary Examiner* — Faisal M Zaman
(74) *Attorney, Agent, or Firm* — Knobbe, Martens, Olson & Bear, LLP (57) ABSTRACT

In example implementations, a computing device is provided. The computing device includes a processor, a multiplexer, a first memory, a second memory, and a controller. The processor is to execute an operating system (OS). The multiplexer is coupled to the processor. The first memory is coupled to the multiplexer to store current basic input/output system (BIOS) instructions. The second memory is coupled to the multiplexer. The controller is coupled to the multiplexer to control connections of the multiplexer to allow the processor to store updated BIOS instructions in the second memory in a background while the OS is executed by processor.

13 Claims, 5 Drawing Sheets

(56) References Cited

U.S. PATENT DOCUMENTS

| | | | |
|---|---|---|---|
| 2009/0259837 A1* | 10/2009 | Wu | G06F 11/1456 713/2 |
| 2009/0276613 A1* | 11/2009 | Huang | G06F 15/7803 713/2 |
| 2012/0110562 A1* | 5/2012 | Heinrich | G06F 8/65 717/169 |
| 2014/0047224 A1* | 2/2014 | Ayanam | G06F 8/654 713/1 |
| 2016/0055113 A1 | 2/2016 | Hodge et al. | |
| 2017/0053111 A1* | 2/2017 | Stewart | G06F 9/4406 |
| 2018/0322013 A1* | 11/2018 | Yang | G06F 11/1417 |
| 2020/0272738 A1* | 8/2020 | Shroff | G06F 11/1417 |
| 2020/0320200 A1* | 10/2020 | Singh | G06F 8/65 |
| 2020/0341744 A1* | 10/2020 | Suryanarayana | G06F 8/65 |
| 2021/0110041 A1* | 4/2021 | Stewart | G06F 21/572 |
| 2022/0155990 A1* | 5/2022 | Piwonka | G06F 3/0679 |

\* cited by examiner

BIOS UPDATES

BACKGROUND

Computing devices help provide productivity. The computing devices can execute programs, process data, and the like, for a variety of different applications. A computing device may use an operating system as a host environment to execute the programs and processes.

In some instances, the firmware for the basic input/output system (BIOS) may be updated. To prevent malicious attacks on the firmware, the memory of the BIOS is electrically isolated during the firmware update. The process can take several minutes, and the computing device displays an update screen while the firmware is being updated.

DETAILED DESCRIPTION

Examples described herein provide a computing device with an ability to perform BIOS instruction updates in the background while the operating system is being executed. As discussed above, the instructions for the BIOS of the computing device may be updated. To prevent malicious attacks on the BIOS instructions, a portion of memory of the BIOS may be chip set locked until a reset is performed. When the reset is performed to write the updated BIOS onto the portion of memory of the BIOS that stores the BIOS instructions, the user may see an update screen that indicates BIOS applications are executing to update the BIOS instructions. The process can take several minutes, and the computing device displays an update screen while the BIOS instructions are being updated.

However, when the update screen is shown, the computing device does not execute the operating system to avoid possible malicious attacks or access to the BIOS memory. During the BIOS instructions update, the computing device may be unavailable for use. As a result, many users may avoid performing the BIOS instructions update due to the disruption to using the computing device during the BIOS instructions update.

The present disclosure provides a BIOS that includes a multiplexer (mux) switch and redundant flash memory. The mux switch may be controlled by a private controller to establish different connections between the processor of the computing device, the private controller, and the redundant flash memory. Thus, the memory may be electrically isolated while BIOS instructions are being updated, while the OS can still operate off of the current BIOS instructions from one of the redundant flash memory locations.

In addition, the BIOS of the present disclosure may allow for manual or automatic roll backs if the update is unsuccessful or if the user wants to manually roll back the update. For example, the BIOS may include a timer. If the timer expires before the updated BIOS instructions are successfully booted, the BIOS may automatically roll back the update to the previously used BIOS instructions that are stored in the redundant flash memory. In an example, after the BIOS instructions are updated, a user may still rollback the update to the older BIOS instructions using a sequence of keystrokes, in response to executed diagnostic software, specific commands to the BIOS, and the like.

Thus, the present disclosure provides a BIOS that allows BIOS instructions to be updated securely and in the background while the OS is being executed. This may allow users to continue to work in the OS environment while the BIOS instructions are being updated. As a result, users may be encouraged to update the BIOS instructions without disrupting productivity on the computing device.

Figure 1:
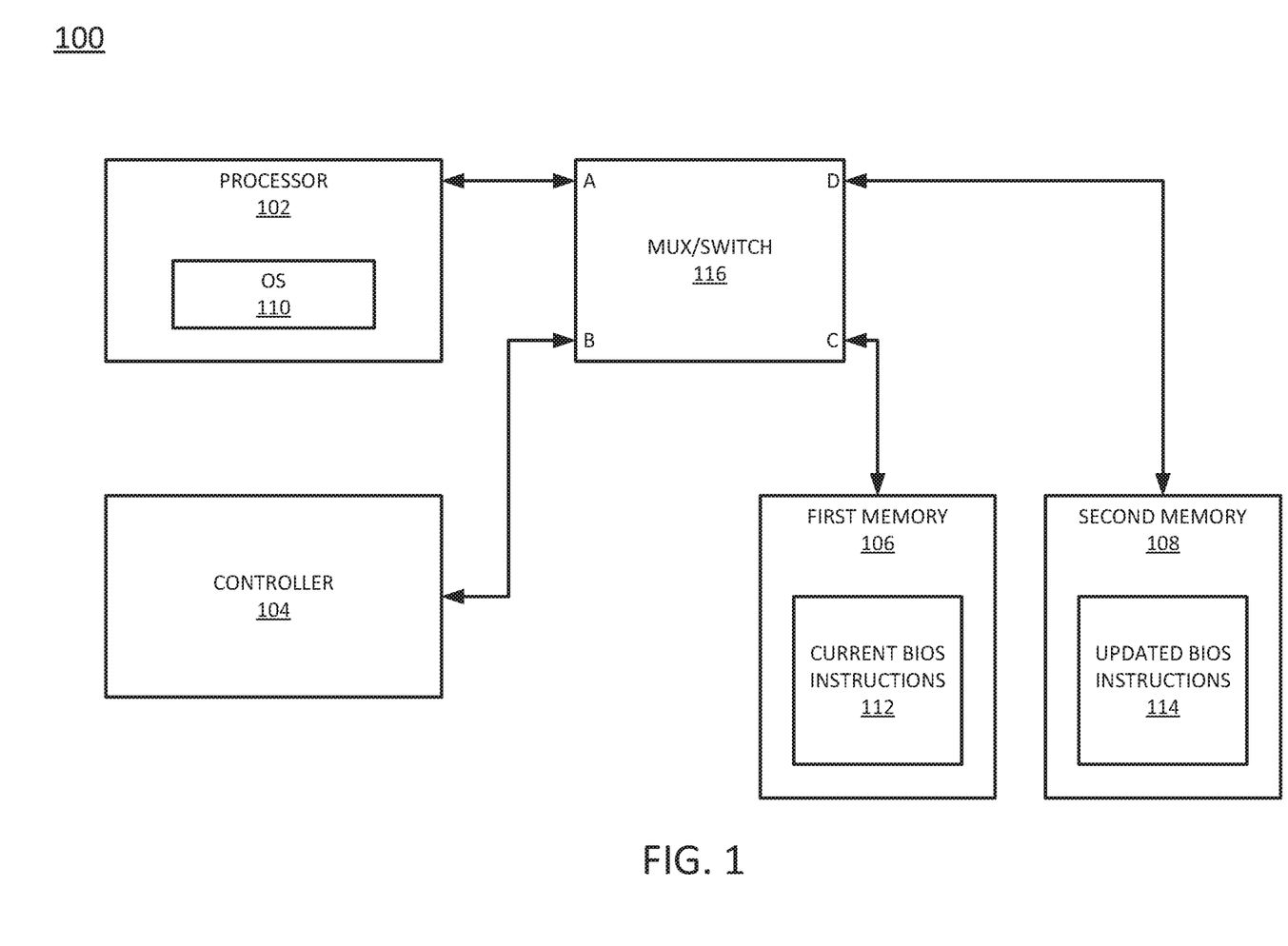
FIG. 1 is a block diagram of an example apparatus to provide BIOS instruction updates via a multiplexer and flash memories connected to the multiplexer of the present disclosure.

FIG. 1 illustrates an example apparatus 100 of the present disclosure that may include multiplexer or switch (mux/switch) 116 that is connected to a first memory 106 and a second memory 108 for performing the BIOS instruction updates of the present disclosure. In an example, the apparatus 100 may be a computing device. For example, the apparatus 100 may be a desktop computer, a laptop computer, a tablet computer, and the like. It should be noted that the apparatus 100 has been simplified for ease of explanation and may include additional components that are not shown. For example, the apparatus 100 may include external input/output interfaces (e.g., universal serial bus (USB) interfaces), input/output devices (e.g., a keyboard, a mouse, a touchpad, a display), power supplies, other integrated circuits, and the like.

In an example, the apparatus 100 may be a Basic Input/Output System (BIOS) of the computing device. As used herein, a BIOS refers to hardware or hardware and instructions to initialize, control, or operate a computing device prior to execution of an operating system (OS) of the computing device. Instructions included within a BIOS may be software, firmware, microcode, or other programming that defines or controls functionality or operation of a BIOS. In one example, a BIOS may be implemented using instructions, such as platform firmware of a computing device, executable by a processor. A BIOS may operate or execute prior to the execution of the OS of a computing device. A BIOS may initialize, control, or operate components such as hardware components of a computing device and may load or boot the OS of the computing device.

In some examples, a BIOS may provide or establish an interface between hardware devices or platform firmware of the computing device and an OS of the computing device, via which the OS of the computing device may control or operate hardware devices or platform firmware of the computing device. In some examples, a BIOS may implement the Unified Extensible Firmware Interface (UEFI) specification or another specification or standard for initializing, controlling, or operating a computing device.

In an example, the apparatus 100 may include a processor 102, a controller 104, the first memory 106, the second memory 108 and the mux 116. The processor 102, the controller 104, the first memory 106, and the second memory 108 may be connected to the mux 116.

In an example, the mux 116 may include four ports (e.g., port A, B, C, and D illustrated in FIG. 1). The processor 102 may be connected to a first port (e.g., port A), the controller may be coupled to a second port (e.g., port B), the first memory 106 may be coupled to third port (e.g., port C), and the second memory 108 may be coupled to a fourth port (e.g., port D). Each port may be bi-directional. In an example, each port may be able to carry a plurality of discrete signals. For example, each port of the mux 116 may include up to six discrete signals. For example, the signals may include signals such as a clock signal, a chip select signal, a pair of master data output slave data input signals, a pair of master data input slave data output signals, and the like.

In an example, the processor 102 may be a main processor or host of the computing device. For example, the processor 102 may execute various applications stored in a hard disk drive or main memory of the computing device. In an example, the processor 102 may execute an operating system (OS) 110 of the computing device. For example, the instructions of the OS 110 may be loaded from memory and executed by the processor 102. The processor 102 may also obtain updated BIOS instructions 114 that are stored in the second memory 108, as discussed in further details below.

In an example, the controller 104 may be BIOS controller. The controller 104 may initiate and control BIOS instructions via control of the mux 116, as discussed in further details below. The controller 104 may also include public keys to verify updated BIOS instructions that are stored in the first memory 106 or the second memory 108.

In an example, the first memory 106 and the second memory 108 may be flash memory devices that may be used to store different versions of the BIOS instructions. For example, current BIOS instructions 112 can be stored in the first memory 106 and updated BIOS instructions 114 may be stored in the second memory 108. However, it should be noted that the updated BIOS instructions 114 may be stored in the first memory 106 and the current BIOS instructions 112 may be stored in the second memory 108.

In an example, the controller 104 may control connections of the mux 116 to create various connections between the processor 102, the controller 104, the first memory 106, and the second memory 108. In response to a request to update the current BIOS instructions 112, the controller 104 may control the mux 116 to electrically isolate the first memory 106 while the updated BIOS instructions 114 are stored in the second memory 108.

For example, the processor 102 may be connected to the first memory 106 (e.g., A-C) to boot the current BIOS instructions 112. When the request to update the current BIOS instructions 112 is received, the controller 104 may switch the mux 116 to connect the processor 102 on the first port (e.g., port A) to the second memory 108 on the fourth port (e.g., port D). The controller 104 on the second port (e.g., port B) may be connected to the first memory 106 on the third port (e.g., port C). Thus, the first memory 106 may be disconnected from the processor 102 and electrically isolated from the processor 102.

The processor 102 may download (e.g., from an external memory device, from a website, and the like) and load the updated BIOS instructions 114 into the second memory 108. After the updated BIOS instructions 114 are stored, the processor 102 may send an indication to the controller 104 that the updated BIOS instructions 114 are stored in the second memory 108.

The controller 104 may then switch the mux 116 to disconnect the processor 102 from the first memory 106 and the second memory 108. For example, the first port (e.g., port A) connected to the processor 102 may be placed in a high impedance state after the updated BIOS instructions 114 are stored in the second memory 108. The controller 104 may switch the mux 116 to connect the controller 104 on the second port (e.g., port B) to the second memory 108 on the fourth port (e.g., port D). The controller 104 may verify the updated BIOS instructions 114 (e.g., using a public key stored in the controller 104).

Figure 2:
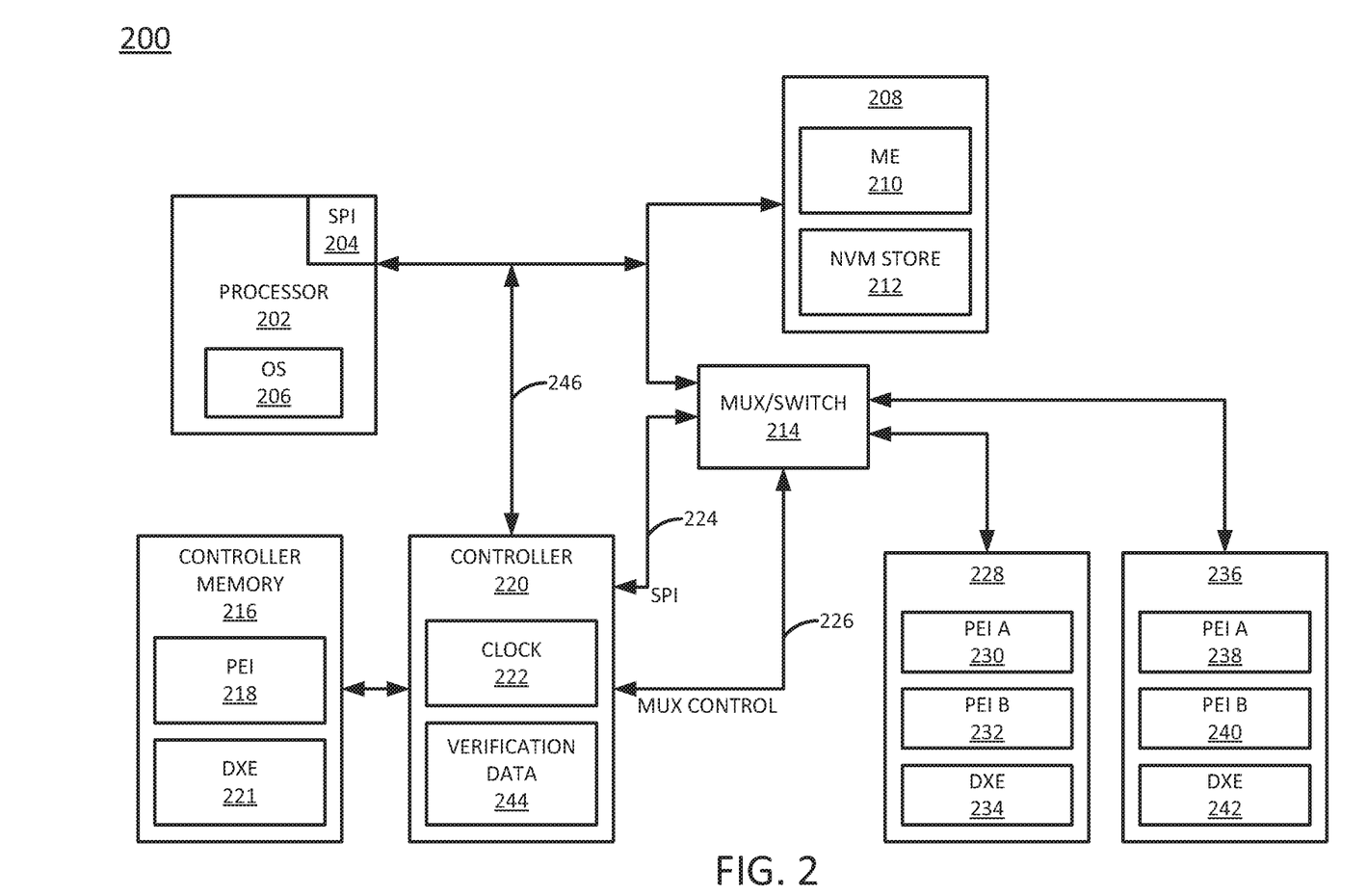
FIG. 2 is a block diagram of an example apparatus to provide BIOS instruction updates via a multiplexer and flash memories connected to the multiplexer with rollbacks of the present disclosure.

After the updated BIOS instructions 114 are verified, the controller 104 may update the BIOS instructions stored in a memory of the controller (not shown, but illustrated in further details in FIG. 2). The controller 104 may then send an indication to the processor 102 that the verification is complete. The controller 104 may switch the mux 116 to connect the processor 102 on the first port (e.g., port A) to the second memory 108 on the fourth port (e.g., port D) and the controller 104 on the second port (e.g., port B) to the first memory 106 on the third port (e.g., port C). The controller 104 may then cause the processor 102 to restart and boot the updated BIOS instructions 114 from the second memory 108.

Once the updated BIOS instructions 114 are booted successfully, the updated BIOS instructions 114 may become the current BIOS instructions 112. When a request to update the current BIOS instructions 112 are received again at a later time, the above process may be repeated, and the updated BIOS instructions 114 may be stored in the first memory 106.

In addition, with the architecture of the apparatus 100, the processor 102 may be able to execute the OS 110 while the updated BIOS instructions 114 are being added to the second memory 108. As noted above, the controller 104 may electrically isolate the first memory 106 with the current BIOS instructions 112 via the mux 116 while the updated BIOS instructions 114 are being stored in the second memory 108. As a result, the processor 102 may execute the OS 110 without risk of corrupting the current BIOS instructions 112 stored in the first memory 106, while the updated BIOS instructions 114 are stored in the second memory 108.

Allowing the processor 102 to execute the OS 110 while the BIOS instructions are updated in the background may allow a user to operate applications in the OS 110 while the BIOS instructions are being updated. Thus, users may be more willing to perform BIOS instructions updates, since the updates can be performed in the background.

FIG. 2 illustrates a more detailed block diagram of an apparatus 200 of the present disclosure that may include a mux 214 that is connected to a first memory 228 and a second memory 236 for performing the BIOS instructions update of the present disclosure. In an example, the apparatus 200 may be a computing device. For example, the apparatus 200 may be a desktop computer, a laptop computer, a tablet computer, and the like. It should be noted that the apparatus 200 has been simplified for ease of explanation and may include additional components that are not shown. For example, the apparatus 200 may include external input/output interfaces (e.g., universal serial bus (USB) interfaces), input/output devices (e.g., a keyboard, a mouse, a touchpad, a display), power supplies, other integrated circuits, and the like. In an example, the apparatus 200 may be the BIOS of the computing device.

In an example, mux 214 may be similar to the mux 116. For example, the mux 214 may include a plurality of ports (e.g., four ports). The processor 202, a controller 220, the first memory 228, and the second memory 236 may be each coupled to a port of the mux 214. The processor 202 and the controller 220 may be coupled to ports on a first side of the mux 214, and the first memory 228 and the second memory 236 may be coupled to ports on a second side of the mux 214. Each port of the mux 214 may be bi-directional and may be able to carry a plurality of discrete signals.

In an example, the processor 202 may include a serial peripheral interface (SPI) 204. The SPI 204 may include a combination of hardware components and wiring (e.g., shift registers, a communication bus, and associating wiring between components) and associated software protocols (e.g., a synchronous serial communication protocol that can provide full duplex communications within the device), The SPI 204 may allow the processor 202 to communicate with other controllers and registers within the apparatus 200. For example, the processor 202 may communicate signals to the controller 220 via the SPI 204. In an example, some signals may be sent using a windows management interface (WMI) protocol, as discussed in further details herein.

The processor 202 may be the main processor or host of the computing device. For example, the processor 202 may execute various applications stored in a hard disk drive or main memory of the computing device. In an example, the processor 202 may execute an OS 206 of the computing device. For example, the instructions of the OS 206 may be loaded from memory and executed by the processor 202. The processor 202 may also obtain updated BIOS instructions that are stored in the first memory 228 or the second memory 236, as discussed in further details below.

In an example, the apparatus 200 may include a third memory 208. The third memory 208 may be a data/management engine (ME) memory device 208. The third memory 208 may include an ME 210 and a non-volatile memory (NVM) store 212. The NVM store 212 may store various information, such as dynamic BIOS instructions (e.g., BIOS settings and variables) that are used by the processor 202 during a boot process, as well as other data that is used by the ME 210.

In previous designs, the BIOS instructions were stored in the third memory 208. However, other devices used the data stored in the NVM store 212 (e.g., the ME 210). Execution of the OS 206 by the processor 202 and trying to update the BIOS instructions prevented the third memory 208 from being electrically isolated.

However, as noted above, the present disclosure uses a combination of the mux 214, the first memory 228, and the second memory 236 to store copies of current BIOS instructions and updated BIOS instructions. The combination of the mux 214 and the first memory 228 and the second memory 236 allows the current BIOS instructions to be electrically isolated while the updated BIOS instructions are stored into the first memory 228 or the second memory 236. However, the architecture of the present disclosure allows the first memory 228 or the second memory 236 and the third memory 208 to appear as a single memory to the processor 202, while providing the ability to electrically isolate the first memory 228 or the second memory 236 from the processor 202.

For example, if the current BIOS instructions are stored in the first memory 228, the processor 202 can be connected to the second memory 236 via the mux 214 during an update to the BIOS instructions. The first memory 228 can be disconnected from the processor 202 to electrically isolate the first memory 228 from the processor 202. Since the current BIOS instructions are electrically isolated, the processor 202 can execute the OS 206 as the updated BIOS instructions are stored in the second memory 236 without risk of corruption to the current BIOS instructions stored in the first memory 228. Thus, a user can still execute applications or use the OS 206 on the computing device while the updated BIOS instructions are being stored on the second memory 236.

In an example, the controller 220 may be an endpoint security controller (EPSC) that can control operation of the mux 214. For example, the controller 220 may include a mux control signal line 226 to toggle the mux 214 between different connections. The mux 214 may be switched to update the BIOS instructions between the first memory 228 and the second memory 236, similar to how the mux 116 is switched, as discussed above with respect to FIG. 1.

In example, the controller 220 may also include a controller memory 216. The controller memory 216 may be a private flash memory that is accessible by the controller 220 and no other device in the apparatus 200. In an example, the controller memory 216 may include a pre-extensible firmware interface (PEI) 218 and a driver execution environment (DXE) 221. In an example, the BIOS instructions may use the PEI 218 and the DXE 221 as part of the BIOS boot sequence. The PEI 218 may include instructions that perform tasks such as memory initialization and recovery operations. After the PEI 218 has executed to initialize the memory, the DXE 221 may include instructions that initialize additional hardware drivers, the peripheral component interface bus, run-time services, and the like.

In an example, the BIOS of the apparatus 200 may be a UEFI BIOS. Thus, during a BIOS boot sequence the controller 220 may launch the PEI 218 to initialize memory and recover certain hardware in the apparatus 200. Then the controller 220 may execute the DXE 221 to access more of the system memory of the apparatus 200, execute hardware drivers, runtime applications, and the like.

In an example, the first memory 228 may include a PEI A 230, a PEI B 232, and a DXE 234. The second memory 236 may include a PEI A 238, a PEI B 240, and a DXE 242. In an example, the processor 202 may be executing BIOS instructions from PEI A 230 and the DXE 234. The SPI 204 may chipset lock PEI A 230 in the first memory 228.

When a request to update the BIOS instructions is received by the controller 220 (e.g., through a private windows management interface (WMI) signal or message), the controller 220 may switch the mux 214 to connect the processor 202 to the second memory 236 and the controller 220 to the first memory 228. The processor 202 may continue to execute the OS 206 while updating the BIOS instructions in the second memory 236.

The processor 202 may store updated BIOS instructions in PEI B 240 and DXE 242 of the second memory 236. When the BIOS instructions update is completed, the processor 202 may send an indication or signal to the controller 220 (e.g., an "update complete" message). In response, the controller 220 may switch the mux 214 to connect the controller 220 to the second memory 236. The processor 202 and the first memory 228 may be disconnected and placed in a high impedance state.

The controller 220 may verify the updated BIOS instructions stored in the PEI B 240 and the DXE 242 of the second memory 236. For example, verification data 244 may be stored in memory of the controller 220. The verification data 244 may include a public key or a digital signature to verify the updated BIOS instructions. If the updated BIOS instructions are updated successfully by the controller 220, the controller 220 may send an indication to the processor 202 (e.g., an "update complete" or "verification complete" message).

The controller 220 may switch the mux 214 to connect the processor 202 to the second memory 236 and the controller 220 to the first memory 228. The controller 220 may reboot or restart the processor 202. In response to the restart, the SPI 204 may chipset lock PEI B 240 in the second memory 236. The processor 202 may then initiate the BIOS boot sequence using the updated BIOS instructions (e.g., the PEI B 240 and the DXE 242 stored in the second memory 236). Thus, the chipset lock may prevent the current BIOS instructions from being stored in the PEI B 240 and the DXE 242 in the second memory 236.

In an example, the apparatus 200 may include a resiliency control or automatic roll back of the updated BIOS instructions if the boot sequence fails. For example, the controller 220 may verify the bits of the updated BIOS instructions, but the updated BIOS instructions may be corrupted or include an incorrect instruction that causes the BIOS boot sequence to hang or fail.

In an example, the controller 220 may include a clock 222. The clock 222 may start an internal timer when the processor 202 is restarted. The internal timer may count down from a pre-determined time period (e.g., 1 minute, 5 minutes, and the like). If the internal timer expires before the BIOS boot sequence is completed with the updated BIOS instructions in the PEI B 240 and the DXE 242, then the controller 220 may automatically revert back to the previous BIOS instructions stored in the PEI A 230 and the DXE 234.

For example, the controller 220 may switch the mux 214 to connect the processor 202 back to the first memory 228. The controller 220 may cause the processor 202 to restart and initiate a BIOS boot sequence from the PEI A 230 and the DXE 234 stored in the first memory 228. The SPI 204 may chipset lock the PEI A 230 after the restart.

In an example, if the BIOS boot sequence is successful before the time expires, then the processor 202 may continue to boot from the PEI B 240 and the DXE 242 stored in the second memory 236. In one example, a BIOS controller or the processor may send an indication to the controller 220 before the timer expires to indicate that the BIOS booted successfully. For example, the indication or notification may be sent at a certain point during the BIOS boot sequence (e.g., an end-of-DXE or ready-to-boot portion of the BIOS boot sequence).

In an example, the apparatus 200 may be able to revert back to the previously used BIOS instructions even after the BIOS is successfully updated and booted. For example, a user or a diagnostic application can send a command to the controller 220 to revert back to the previously used BIOS instructions.

In an example, the command may be sent to the controller 220 via a WMI command. In an example, the command can be a particular key (e.g., a function key on a keyboard), a simultaneous combination of keystrokes, or a particular sequence of keystrokes. In an example, the command can be from a diagnostic program that may be examining the BIOS or the software applications of the apparatus 200.

When the request to revert is received, the controller 220 may switch the mux 214 to connect the processor 202 back to the first memory 228. The controller 220 may cause the processor 202 to restart and initiate a BIOS boot sequence from the PEI A 230 and the DXE 234 stored in the first memory 228. The SPI 204 may chipset lock the PEI A 230 after the restart.

In an example, after the BIOS is updated and booted successfully, the controller 220 may receive another request to update the BIOS instructions. If another BIOS update request is received, the process described may be repeated, except the current BIOS instructions would be the PEI B 240 and the DXE 242 stored in the second memory 236. The controller 220 may switch the mux 214 to connect the processor 202 to the first memory 228. The processor 202 may update the BIOS instructions in PEI A 230 and the DXE 234. The updated BIOS instructions may be verified by the controller 220, as described above. If the updated BIOS instructions are successfully updated, the processor 202 may be restarted, the SPI 204 may chipset lock PEI A 230, and the BIOS boot sequence may be initiated from the PEI A 230 and the DXE 234.

In an example, the controller 220 may have access to the third memory 208. For example, the controller 220 may be connected to the third memory 208 via the mux 214 or may have a direct circuit line 246 to access the third memory 208 even when the processor 202 is powered down. The controller 220 may access the third memory 208 to verify the signature of the ME 210, modify data stored in the NVM store 212 (e.g., a descriptor or a pointer in a table), and the like.

Figure 3:
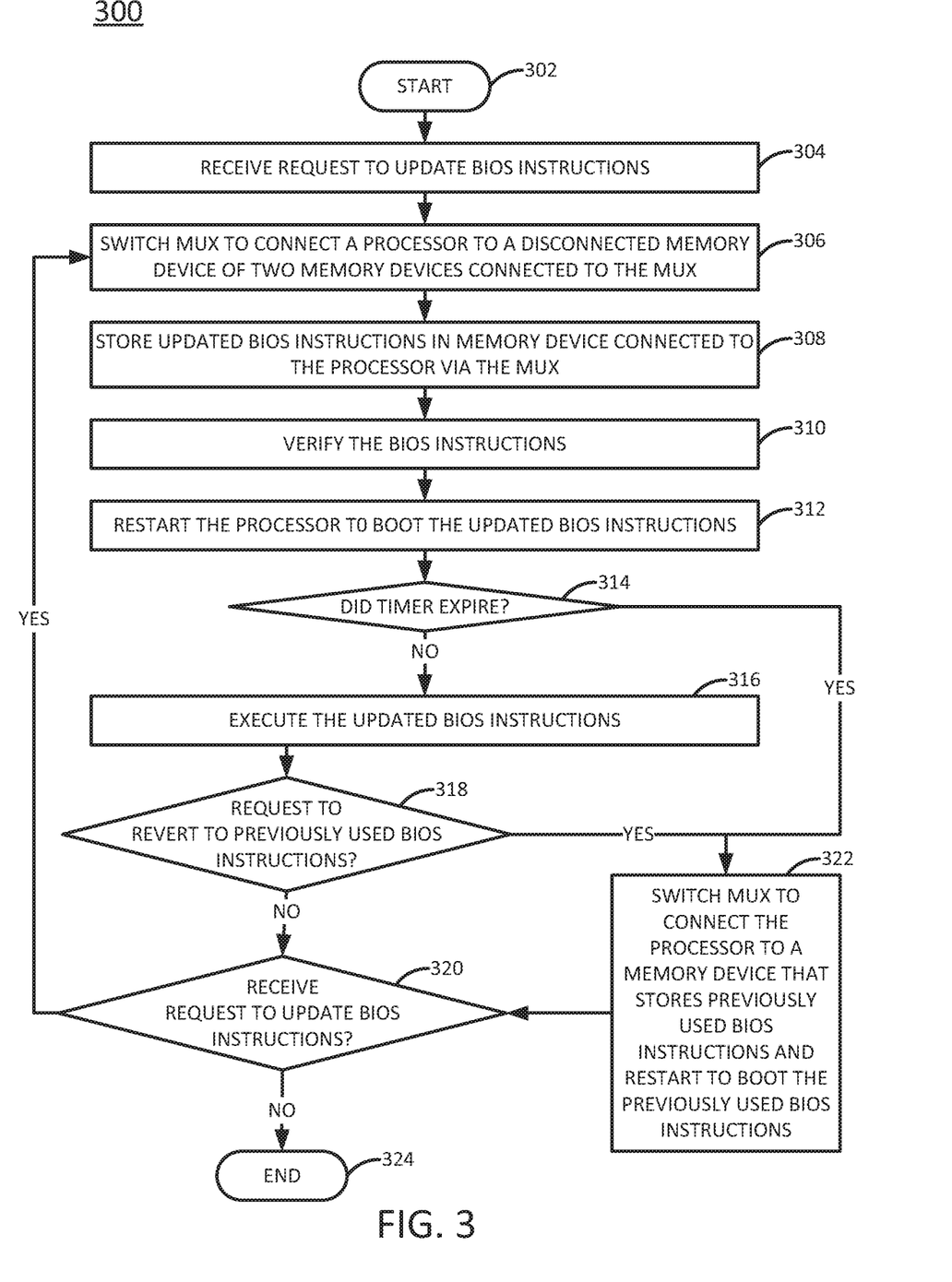
FIG. 3 is a flow chart of an example method for performing a BIOS instruction update of the present disclosure.

FIG. 3 illustrates a flow diagram of an example method 300 for performing a BIOS instructions update of the present disclosure. In an example, the method 300 may be performed by the apparatus 100 or 200, the apparatus 400 illustrated in FIG. 4, and described below, or the apparatus 500 illustrated in FIG. 5, and described below.

At block 302, the method 300 begins. At block 304, the method 300 receives a request to update BIOS instructions. For example, the request may be sent by an application to the processor of a computing device. The processor may then communicate the request to a controller.

At block 306, the method 300 switches a multiplexer (mux) to connect a processor of a computing device to a disconnected memory device of two memory devices connected to the mux. For example, the processor of the computing device, the controller, and two memory devices may be connected to the mux. The processor and the controller may be connected to a first side of the mux and the two memory devices may be connected to the opposite side of the mux.

In an example, one of the memory devices may be connected to the processor and store currently used BIOS instructions. The other memory device may be disconnected from the processor and provide a location for the processor to store updated BIOS instructions in response to the update request. The mux may be switched under the control of the controller.

At block 308, the method 300 stores updated BIOS instructions in a memory device connected to the processor via the mux. For example, the memory device that is now connected to the processor may have a location to store the updated BIOS instructions. The processor may store the updated BIOS instructions while the processor executes an OS. Since the disconnected memory device with the currently used BIOS instructions is electrically isolated, the processor may execute the OS without any chance for the currently used BIOS instructions to be attacked or corrupted.

At block 310, the method 300 verifies the BIOS instructions. In an example, after the updated BIOS instructions are stored in the connected memory device, the processor may send a notification to the controller. The controller may switch the mux to connect the controller to the memory device with the updated BIOS instructions. The processor may be disconnected and placed in a high impedance state during verification.

In an example, the updated BIOS instructions may be verified with verification information stored in a memory of the controller (e.g., a private flash memory, a memory cache of the controller, and the like). The verification information may be a public key or a digital signature.

At block 312, the method 300 restarts the processor to boot the updated BIOS instructions. When the updated BIOS instructions are successfully verified, the controller may instruct the processor to restart or reboot. The controller may switch the mux to connect the processor to the memory device with the updated BIOS instructions.

At block 314, the method 300 determines whether a timer expired. For example, during the reboot process, the controller may start an internal timer. The internal timer may count down a pre-defined amount of time. If the answer is yes (e.g., the timer has expired), the method 300 may proceed to block 322. If the answer is no (e.g., the timer has not expired and the processor was able to successfully boot the updated BIOS instructions), the method 300 may proceed to block 316.

At block 316, the method 300 executes the updated BIOS instructions. For example, the processor may remain connected to the memory device with the updated BIOS instructions via the mux.

At block 318, the method 300 determines if a request to revert to previously used BIOS instructions was received. For example, the request may be initiated by a user or diagnostic application. The request may be initiated by the user via a command signal via a private WMI message, a particular key, a particular sequence of keystrokes, a simultaneous combination of keystrokes, and the like. If the answer is yes, the method 300 may proceed to block 322. If the answer is no, the method 300 may proceed to block 320.

At block 322, from either block 314 or block 318, the method 300 switches the mux to connect the processor to a memory that stores the previously used BIOS instructions and restarts to boot the previously used BIOS instructions. For example, the previous used BIOS instructions may still be stored in the disconnected memory device. In response to revert back to the previously used BIOS instructions, the controller may switch the mux to connect the processor to the memory device with the previously used BIOS instructions. The controller may cause the processor to restart and boot the BIOS from the previously used BIOS instructions. The method 300 then proceeds to block 320.

At block 320, from either block 322 or block 318, the method 300 determines if a request to update the BIOS instructions is received. For example, after the updated BIOS instructions are successfully loaded and booted, the updated BIOS instructions may become the currently used BIOS instructions. At a later time, the BIOS instructions may be updated again. If the answer is yes, the method 300 may return to block 306, and the method 300 may proceed from block 306, as described above.

If the answer is no, the method 300 proceeds to block 324. At block 324, the method 300 ends.

Figure 4:
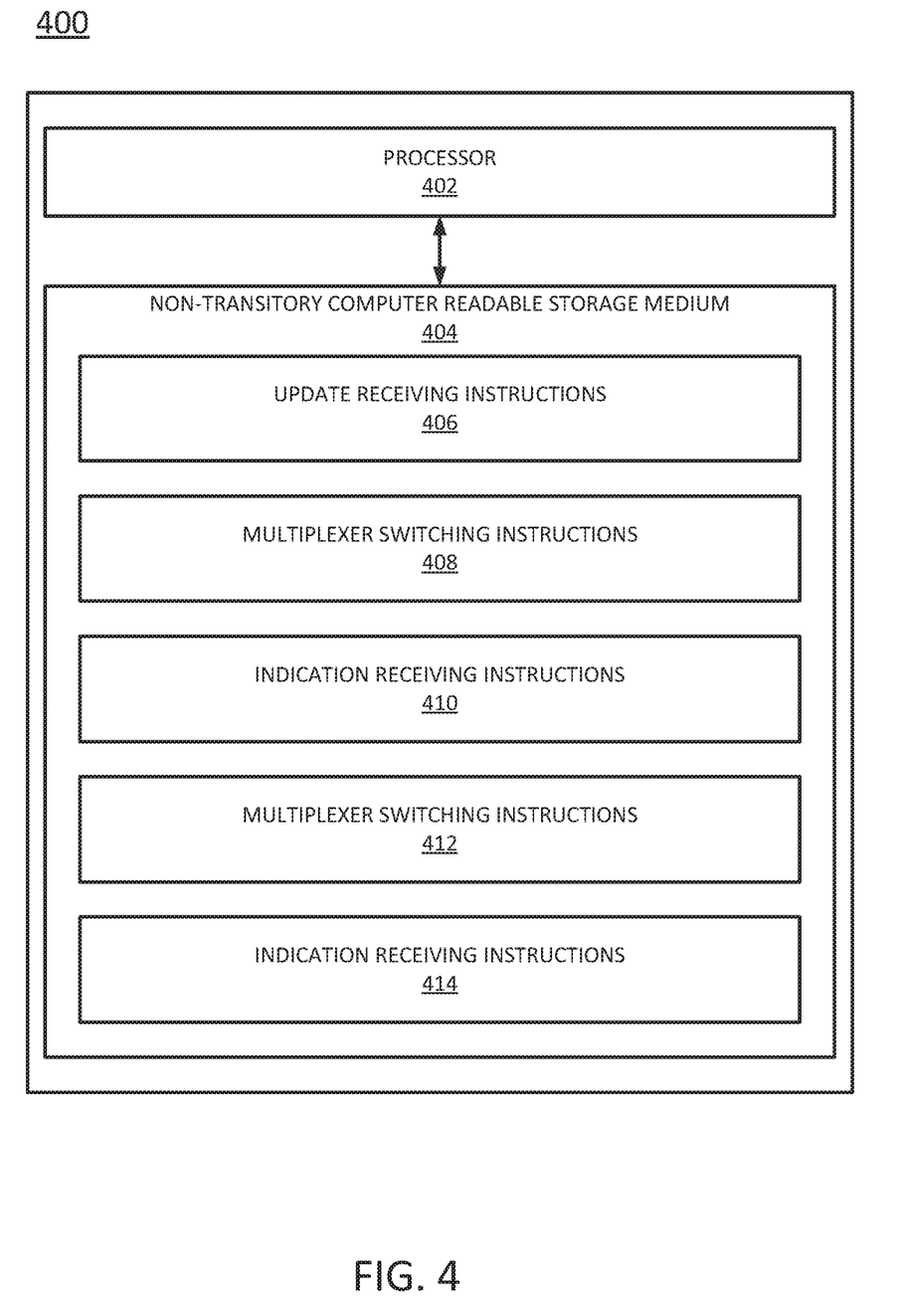
FIG. 4 is an example non-transitory computer readable storage medium storing instructions executed by a processor to perform a BIOS instruction update of the present disclosure.

FIG. 4 illustrates an example of an apparatus 400. In an example, the apparatus 400 may be the apparatus 100 or 200. In an example, the apparatus 400 may include a processor 402 and a non-transitory computer readable storage medium 404. The non-transitory computer readable storage medium 404 may include instructions 406, 408, 410, 412, and 414 that, when executed by the processor 402, cause the processor 402 to perform various functions.

In an example, the instructions 406 may include update receiving instructions. For example, the instructions 406 may cause the processor 402 to receive a request to update Basic Input/Output System (BIOS) instructions.

The instructions 408 may include multiplexer switching instructions. For example, the instructions 408 may cause the processor 402 to switch a multiplexer to connect a processor of the computing device to a first memory, wherein the first memory is connected to the multiplexer.

The instructions 410 may include indication receiving instructions. For example, the instructions 410 may cause the processor 402 to receive an indication that updated BIOS instructions are stored in the first memory.

The instructions 412 may include multiplexer switching instructions. For example, the instructions 412 may cause the processor 402 to switch the multiplexer to connect the processor of the computing device to the first memory and restart the processor to load the updated BIOS instructions from the first memory.

The instructions 414 may include indication receiving instructions. For example, the instructions 414 may cause the processor 402 to receive an indication that the updated BIOS instructions are booted successfully before a timer expires.

Figure 5:
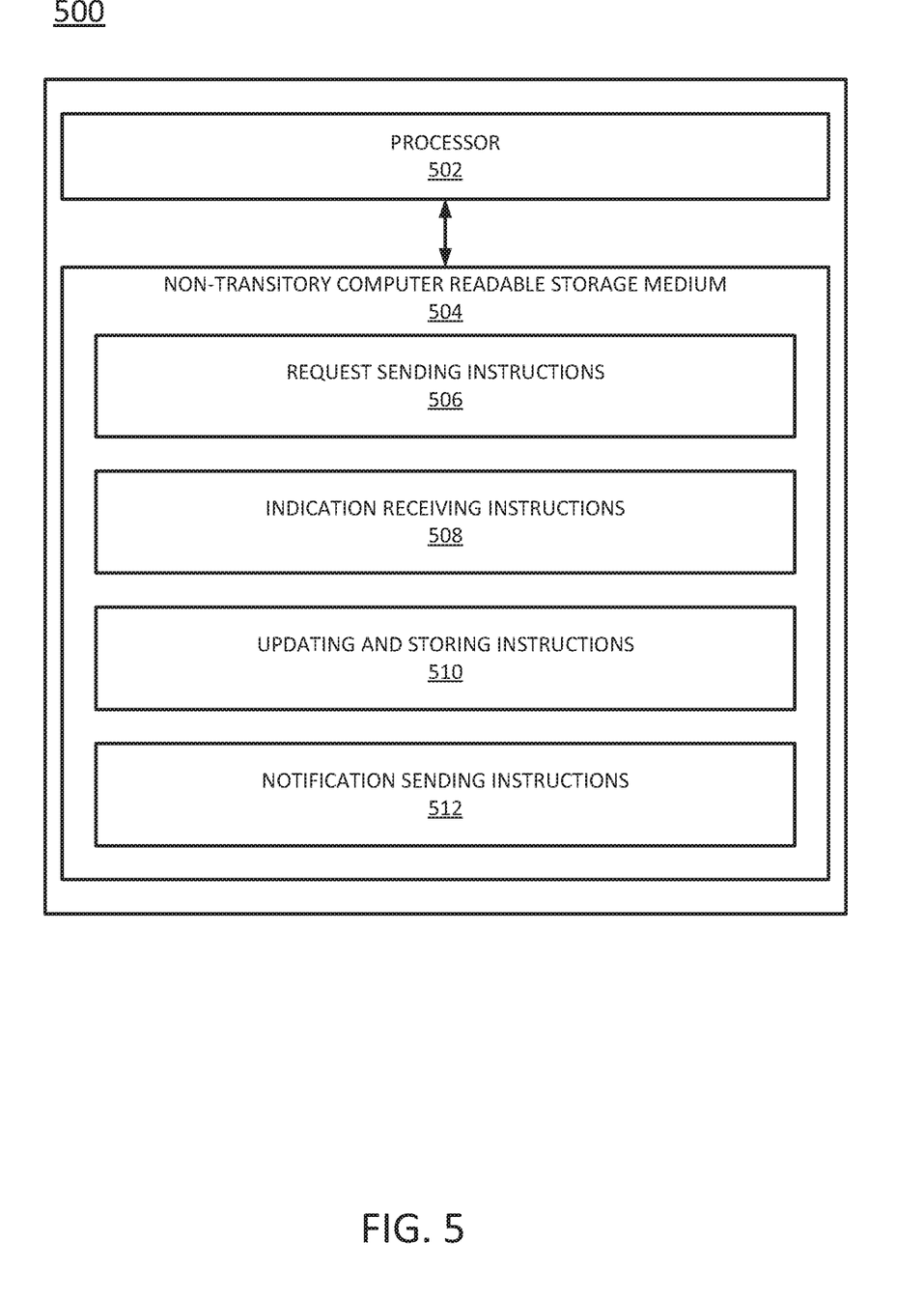
FIG. 5 is an example non-transitory computer readable storage medium storing instructions executed by a processor to perform a BIOS instruction update of the present disclosure.

FIG. 5 illustrates an example of an apparatus 500. In an example, the apparatus 500 may be the apparatus 100 or 200. In an example, the apparatus 500 may include a processor 502 and a non-transitory computer readable storage medium 504. The non-transitory computer readable storage medium 504 may include instructions 506, 508, 510, and 512 that, when executed by the processor 502, cause the processor 502 to perform various functions.

In an example, the instructions 506 may include request sending instructions 506. For example, the instructions 506 may cause the processor 502 to send a request to a controller of a Basic Input/Output System (BIOS) to update BIOS instructions.

The instructions 508 may include indication receiving instructions. For example, the instructions 508 may cause the processor 502 to receive an indication that a multiplexer is switched by the controller to connect the processor to a first memory in response to the request, wherein the first memory is connected to the multiplexer.

The instructions 510 may include updating and storing instructions. For example, the instructions 510 may cause the processor 502 to receive an indication that updated BIOS instructions are stored in the first memory before a timer expires.

The instructions 512 may include notification sending instructions. For example, the instructions 512 may cause the processor to send a notification to the controller that the BIOS instructions are updated in the memory location.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A computing device comprising:
   a processor to execute an operating system (OS);
   a multiplexer connected to the processor;
   a first memory connected to the multiplexer, wherein the first memory is to store Basic Input/Output System (BIOS) instructions, and wherein the first memory is connected to the processor via the multiplexer;
   a second memory connected to the multiplexer; and
   a controller connected to the multiplexer, wherein the controller is to:

while the processor executes the OS,
receive a request to update the BIOS instructions;
switch the multiplexer to disconnect the processor from the first memory and connect the processor to the second memory so that the processor can store updated BIOS instructions in the second memory;
receive an indication that the updated BIOS instructions are stored in the second memory;
switch the multiplexer to disconnect the processor from the second memory and connect the controller to the second memory; and
verify the updated BIOS instructions in the second memory.

2. The computing device of claim 1, wherein the processor is connected to a first port of the multiplexer, the controller is connected to a second port of the multiplexer, the first memory is connected to a third port of the multiplexer, and the second memory is connected to a fourth port of the multiplexer.

3. The computing device of claim 2, wherein to switch the multiplexer to disconnect the processor from the first memory and connect the processor to the second memory, the controller is to switch the multiplexer to disconnect the processor from the first port of the multiplexer and connect the processor to the fourth port of the multiplexer.

4. The computing device of claim 3,
wherein to switch the multiplexer to disconnect the processor from the second memory and connect the controller to the second memory, the controller is to switch the multiplexer to disconnect the processor from the fourth port of the multiplexer, disconnect the controller from the second port of the multiplexer, and connect the controller to the fourth port of the multiplexer, and
wherein the controller is further to place the first port of the multiplexer in a high impedance state to verify the updated BIOS instructions in the second memory.

5. The computing device of claim 4, wherein the controller is further to;
after the updated BIOS instructions are verified, switch the multiplexer to disconnect the controller from the fourth port of the multiplexer and connect the processor to the fourth port of the multiplexer so that the processor can boot a BIOS with the updated BIOS instructions stored in the second memory.

6. The computing device of claim 1 further comprising:
a third memory communicatively connected to the controller to store a public key to verify the updated BIOS instructions.

7. The computing device of claim 1 further comprising:
a fourth memory connected to the multiplexer, wherein the fourth memory is to store a management engine and BIOS settings.

8. A non-transitory computer readable medium storing instructions that, when executed by a controller of a computing device, cause the controller to:
receive a first request to update Basic Input/Output System (BIOS) instructions;
switch a multiplexer to connect a processor of the computing device to a first memory, wherein the first memory is connected to the multiplexer;
receive an indication that first updated BIOS instructions are stored in the first memory;
restart the processor to boot the first updated BIOS instructions from the first memory;
receive an indication that the first updated BIOS instructions are booted successfully before a timer expires;
receive a second request to update BIOS instructions;
switch the multiplexer to connect the processor to a second memory, wherein the second memory is connected to the multiplexer;
receive an indication that second updated BIOS instructions are stored in the second memory; and
switch the multiplexer to connect the controller to the second memory to verify the second updated BIOS instructions.

9. The non-transitory computer readable medium of claim 8 storing further instructions that, when executed by the controller, cause the controller to:
before switching the multiplexer to connect the processor of the computing device to the first memory,
switch the multiplexer to connect the controller to the first memory; and
verify the first updated BIOS instructions stored in the first memory.

10. The non-transitory computer readable medium of claim 8 storing further instructions that, when executed by the controller, cause the controller to:
in response to the timer expiring before receiving the indication that the first updated BIOS instructions are successfully booted, revert to the BIOS instructions.

11. A non-transitory computer readable medium storing instructions that, when executed by a processor, cause the processor to:
send a first request to a controller of a Basic Input/Output System (BIOS) to update BIOS instructions;
receive a first indication that the controller, in response to the first request to update the BIOS instructions, switched a multiplexer to connect the processor to a first memory, wherein the first memory is connected to the multiplexer;
store first updated BIOS instructions in the first memory while executing an operating system (OS);
send a first notification to the controller that the first updated BIOS instructions are stored in the first memory;
receive a second indication to revert to BIOS instructions that were previously installed;
send a second request to the controller to switch the multiplexer to connect to a second memory where the BIOS instructions that were previously installed are located, wherein the second memory is connected to the multiplexer; and
load the BIOS instructions that were previously installed from the second memory.

12. The non-transitory computer readable medium of claim 11, wherein the second indication comprises a user-initiated key sequence, a command signal from a diagnostic application, or a command signal from a BIOS interface.

13. The non-transitory computer readable medium of claim 11 storing further instructions that, when executed by the processor, cause the processor to:
send a third request to the controller to update the BIOS instructions to cause the controller to switch the multiplexer to connect the processor to the second memory;
store second updated BIOS instructions in the second memory while executing the OS; and
send a second notification to the controller that the second updated BIOS instructions are stored in the second memory.

* * * * *